(No Model.)
W. H. PITT.
APPARATUS FOR DISTILLING CRUDE PETROLEUM.
No. 411,394. Patented Sept. 17, 1889.
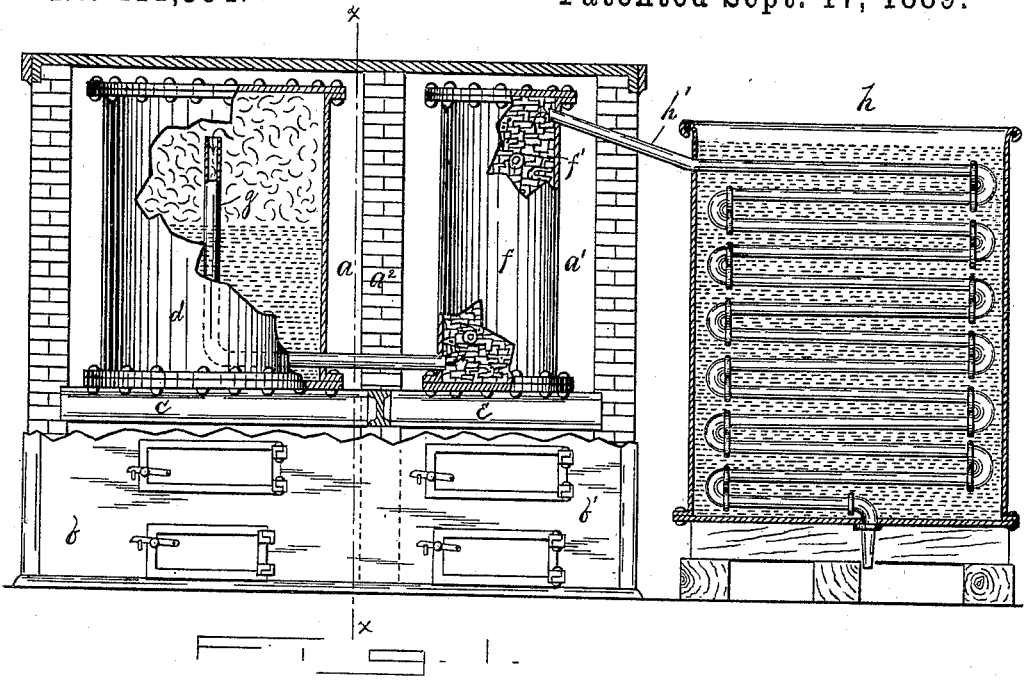
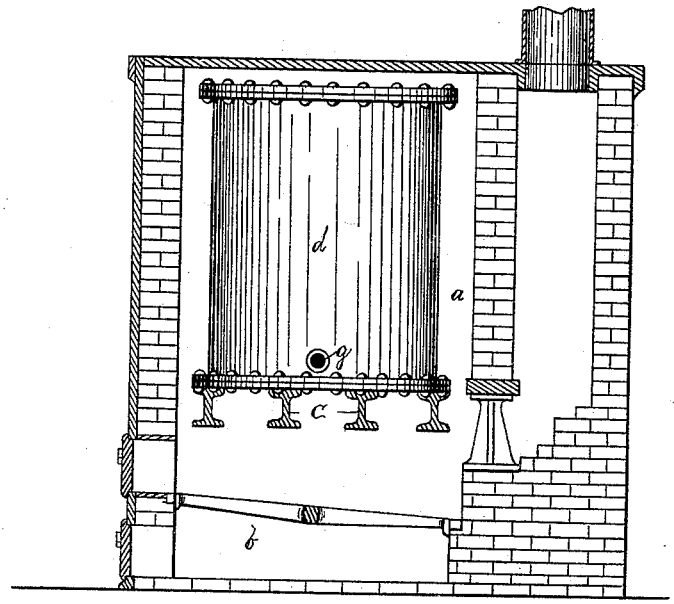
Witnesses:
Otto Hoddick.
F. W. Fisher.
Inventor.
William H. Pitt
By
W. F. Miller
Attorney.

UNITED STATES PATENT OFFICE.

WILLIAM H. PITT, OF BUFFALO, NEW YORK, ASSIGNOR, BY DIRECT AND MESNE ASSIGNMENTS, TO THE APEX REFINING COMPANY, OF SAME PLACE.

APPARATUS FOR DISTILLING CRUDE PETROLEUM.

SPECIFICATION forming part of Letters Patent No. 411,394, dated September 17, 1889.

Application filed January 27, 1888. Serial No. 262,129. (No model.)

*To all whom it may concern:*

Be it known that I, WILLIAM H. PITT, a citizen of the United States, residing at Buffalo, in the county of Erie and State of New York, have invented certain new and useful Improvements in Apparatus for Distilling Crude Petroleum; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In some of the petroleum-oils there is a strong odor somewhat like the smells of garlics, which escapes gradually from such oils when exposed to the air at the wells in open barrels, tanks, and other receptacles which may be used to hold them. The series of liquid distillates or hydrocarbons under the familiar names of naphtha, benzine, kerosene, and lubricating-oil having this garlicky odor are thus greatly damaged for the market; and the object of my invention is to provide an apparatus by means of which these objectionable features may be eradicated.

In Patent No. 379,492, granted March 13, 1888, to myself and to George H. Van Vleck, assignee, for a process of distilling petroleum, by means of which the result is accomplished, I have shown and described the apparatus which is to form the subject-matter of this invention as a means of illustrating the manner of carrying out the process herein claimed. I will now proceed to definitely describe and claim this apparatus.

In the drawings, Figure 1 is a front elevation of my improved apparatus with portions broken away to show interior construction, and Fig. 2 is a vertical section taken in the line $x\ x$ of Fig. 1.

Referring to the drawings, a furnace is seen having the two separate heating-compartments provided, respectively, with the separate fire-boxes $b$ and $b'$, in order that an independent fire can be maintained in each. In the compartment $a$, and resting upon girders $c$, seated at their ends in the brick walls of the furnace, is the receptacle or retort $d$, in which is placed the offensive crude petroleum to be operated upon. As will be seen clearly in Fig. 2, the retort $d$ is so placed as to permit the heat to circulate freely around, above, and below the retort. In the chamber $a'$ is similarly placed upon the girders $e$ the receptacle $f$, in which the filtration or deodorization is to be effected.

$g$ is a pipe open at both ends and preferably bent at an angle, as shown, its upright portion resting vertically within the retort $d$, its upper open end reaching above the level of the liquid oil in the retort. Its lower or horizontal portion passes out through the side wall of the retort $d$ at or near its bottom, through the division-wall $a^2$ of the two chambers $a$ and $a'$, and into the receptacle or filter $f$, preferably at or near its bottom, as shown. $h$ is a condenser of any well-known form, connected by the pipe $h'$ with the filter $f$ at or near its top, as shown.

The crude petroleum having the offensive odor referred to is placed in the retort $d$ and is there vaporized by the heat of the chamber $a$, such vapor passing down through the pipe $g$, its heat being retained and condensation prevented by the presence of the hot liquid oil around the pipe. In this manner the heat of the liquid oil, which causes its vaporization, is thus utilized in keeping the vapor at its proper temperature, which, on leaving the retort $d$, passes into the bottom of the filter $f$, which is filled with a substance $f'$, suitably divided or comminuted, so as to present to the vapors passing therethrough the greatest contacting surface possible. The substance $f'$ employed should of course be of such a nature as to possess a strong affinity for the sulphurous portions of the vapors in passing contact with the substance, and may consist of different metals or their bases, but preferably iron.

The deodorizing substance $f'$ is kept always at about the same or a higher temperature than the vapors entering the filter by the independent heat of chamber $a'$.

The pipe $g$ need not necessarily enter the bottom of the filter for effective results, although this is my preferred arrangement.

I claim—

The apparatus for distilling and deodorizing petroleum having sulphurous or other offensive odors, said apparatus consisting of a furnace with two fire-places, a retort over one fire-place and a deodorizing receptacle over the other fire-place, and a pipe opening into the upper part of the retort and passing down through the retort and out near the bottom of the latter to the said receptacle, which has a discharge-outlet for the deodorized vapors, all substantially as described.

In testimony whereof I have signed my name to this specification in the presence of two subscribing witnesses.

WILLIAM H. PITT.

Witnesses:
W. T. MILLER,
OTTO HODDICK.